US009239910B2

(12) United States Patent
Kim et al.

(10) Patent No.: US 9,239,910 B2
(45) Date of Patent: Jan. 19, 2016

(54) SYSTEM AND METHOD FOR PREVENTING THE LEAKING OF DIGITAL CONTENT

(75) Inventors: Dong Hwa Kim, Gyeonggi-do (KR); Chang Hun Yoo, Seoul (KR); Jin Hyug Choi, Seoul (KR); Un Yeong Heo, Seoul (KR); Dong Hwan Shin, Seoul (KR)

(73) Assignee: Markany Inc., Seoul (KR)

( * ) Notice: Subject to any disclaimer, the term of this patent is extended or adjusted under 35 U.S.C. 154(b) by 77 days.

(21) Appl. No.: 13/407,319

(22) Filed: Feb. 28, 2012

(65) Prior Publication Data

US 2012/0255029 A1    Oct. 4, 2012

(30) Foreign Application Priority Data

Apr. 4, 2011 (KR) .......................... 10-2011-0030575
Sep. 15, 2011 (KR) .......................... 10-2011-0092953

(51) Int. Cl.
*G06F 21/10* (2013.01)

(52) U.S. Cl.
CPC ........ *G06F 21/10* (2013.01); *G06F 2221/0737* (2013.01)

(58) Field of Classification Search
CPC combination set(s) only.
See application file for complete search history.

(56) References Cited

U.S. PATENT DOCUMENTS

| 6,101,602 | A  * | 8/2000  | Fridrich ...................... 713/176 |
| 6,574,609 | B1 * | 6/2003  | Downs et al. .................. 705/50  |
| 6,674,858 | B1 * | 1/2004  | Kimura et al. ................ 380/202 |
| 7,140,043 | B2 * | 11/2006 | Choi et al. .................... 726/26  |
| 7,254,772 | B2 * | 8/2007  | Penke et al. .................. 715/273 |
| 7,380,120 | B1 * | 5/2008  | Garcia .......................... 713/160 |
| 7,447,329 | B2 * | 11/2008 | Choi et al. .................... 382/100 |
| 2001/0003194 | A1 * | 6/2001 | Shimura et al. .............. 709/310 |
| 2001/0023421 | A1 * | 9/2001 | Numao et al. ................... 707/9  |
| 2001/0025342 | A1 * | 9/2001 | Uchida ......................... 713/186 |
| 2002/0028064 | A1 * | 3/2002 | Ogino et al. .................... 386/94 |
| 2003/0160823 | A1 * | 8/2003 | Stannard ....................... 345/764 |
| 2003/0204736 | A1 * | 10/2003 | Garrison et al. ............. 713/193 |
| 2004/0024860 | A1 * | 2/2004 | Sato et al. ..................... 709/223 |
| 2004/0071311 | A1 * | 4/2004 | Choi et al. .................... 382/100 |

(Continued)

FOREIGN PATENT DOCUMENTS

KR         10-0499056       6/2005
KR         10-2006-0032332  4/2006

OTHER PUBLICATIONS

Korean Patent Abstracts, No. 1020040033540 A, dated Apr. 28, 2004 (corresponds to KR Publication No. 10-0499056) (2 pages).

(Continued)

*Primary Examiner* — Peter Poltorak
(74) *Attorney, Agent, or Firm* — Osha Liang LLP

(57) ABSTRACT

There are disclosed a system and method for preventing the leaking of digital content. The system for preventing the leaking of digital content may include a digital content layer generation unit for generating a digital content layer displaying digital content, a security layer generation unit for generating a security layer including security information based on information about a user terminal, and an information display unit for displaying the security layer generated by the security layer generation unit and the digital content layer generated by the digital content layer generation unit in the display device of the user terminal in an overlapping form so that the security information looks like overlapping with the digital content. Accordingly, the illegal leaking of digital content through photographing or screen capture can be prevented.

13 Claims, 8 Drawing Sheets

Prevent leaking for specific window

Prevent leaking for display screen

(56) References Cited

U.S. PATENT DOCUMENTS

| | | | |
|---|---|---|---|
| 2004/0083369 A1* | 4/2004 | Erlingsson et al. | 713/176 |
| 2004/0090646 A1* | 5/2004 | Saitoh et al. | 358/1.14 |
| 2005/0049970 A1* | 3/2005 | Sato et al. | 705/51 |
| 2005/0207727 A1* | 9/2005 | Hirose et al. | 386/46 |
| 2006/0048237 A1* | 3/2006 | Luo et al. | 726/32 |
| 2006/0239501 A1* | 10/2006 | Petrovic et al. | 382/100 |
| 2007/0033419 A1* | 2/2007 | Kocher et al. | 713/193 |
| 2007/0277039 A1* | 11/2007 | Zhao | 713/176 |
| 2008/0005797 A1* | 1/2008 | Field et al. | 726/24 |
| 2008/0049971 A1* | 2/2008 | Ramos et al. | 382/100 |
| 2008/0115044 A1* | 5/2008 | Inoue | 715/200 |
| 2008/0120499 A1* | 5/2008 | Zimmer et al. | 713/2 |
| 2008/0301426 A1* | 12/2008 | Arges et al. | 713/2 |
| 2008/0313272 A1* | 12/2008 | Nguyen et al. | 709/203 |
| 2009/0319639 A1* | 12/2009 | Gao et al. | 709/219 |
| 2010/0064305 A1* | 3/2010 | Schumann et al. | 725/19 |
| 2010/0215342 A1* | 8/2010 | Lee et al. | 386/95 |
| 2011/0007348 A1* | 1/2011 | Yamaizumi | 358/1.15 |
| 2011/0188700 A1* | 8/2011 | Kim et al. | 382/100 |
| 2013/0254521 A1* | 9/2013 | Bealkowski et al. | 713/2 |

OTHER PUBLICATIONS

Korean Patent Abstracts, No. 1020060032332 A, dated Apr. 17, 2006 (2 pages).

* cited by examiner

FIG. 4
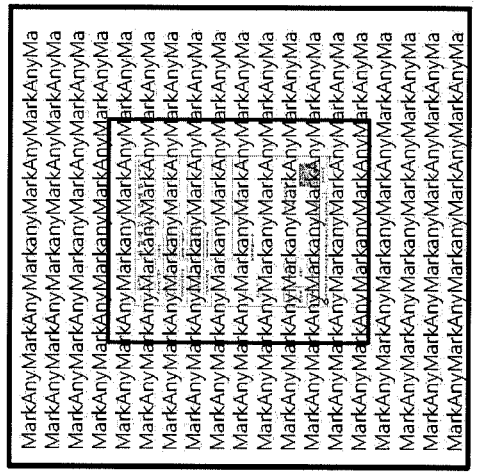
Prevent leaking for display screen
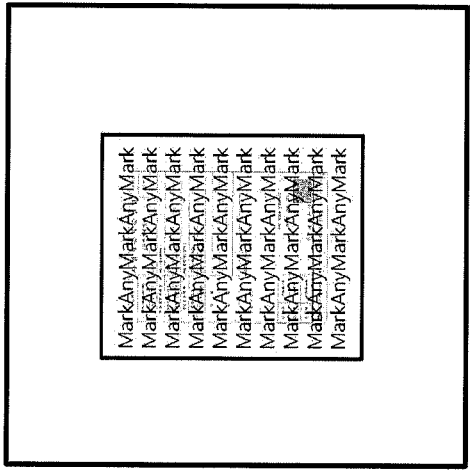
Prevent leaking for specific window

SYSTEM AND METHOD FOR PREVENTING THE LEAKING OF DIGITAL CONTENT

CROSS-REFERENCE TO RELATED APPLICATIONS

This application claims the benefit of priority of Korean Patent Application No. 10-2011-0030575 filed on Apr. 4, 2011 and Korean Patent Application No. 10-2011-0092953 filed on Sep. 15, 2011, all of which is incorporated by reference in its entirety herein.

BACKGROUND OF THE INVENTION

1. Field of the Invention

The present invention relates to a system and method for preventing the leaking of digital content and, more particularly, to technology capable of preventing the leaking of digital content that may occur through screen capture, etc. in a user terminal, such as a computer terminal or a portable terminal, by displaying digital content including information related to the user terminal when the digital content is displayed by using the user terminal.

2. Discussion of the Related Art

Recently, almost all the business or services in an overall life, such as office business, settlement service, the issue of certificates, banking, and electronic commerce, are being carried out through on-line and computerized environments. In the on-line and computerized environments, digital content is the subject of the creation, reading, storage, edition, and transmission of information. The digital content may mean various forms of pieces of digital information (e.g., digital documents and moving images) including images, text, multimedia, and so on.

The digital content is very vulnerable to leaking through illegal actions because the digital content can be easily duplicated and transmitted even without being lost in view of the characteristic of digital information. In order to provide an environment in which digital content can be soundly used, there is a need for protection means (i.e., a security system) capable of preventing the digital content from illegal actions. Digital content may be protected through, for example, encryption and decryption systems, watermark, a fingerprinting system, and a screen capture prevention system.

The screen capture prevention system may be a system for preventing an action to leak digital content displayed through a terminal, such as a PC, by illegally capturing, storing, using, and distributing the digital content. The screen capture prevention system may be implemented in various ways.

For example, Korean Laid-Open Patent Publication No. 2004-0033540 discloses a screen capture prevention system for digital copyright works. The capture prevention system precludes illegal capture and a change of information by detecting requests of application programs from the system to use system services and system functions and analyzing service request patterns in relation to the system services using the application programs. For another example, Korean Laid-Open Patent Publication No. 2006-0032332 discloses a system for preventing the capture of a still image, in which a normal and complete screen cannot be captured when a still image is captured.

In the conventional capture prevention systems, however, the maintenance and repair of the systems according to a change of a screen capture type and an increase of screen capture programs are inevitable, and the capture prevention functions of the systems may be useless regarding the leaking of photos and moving images through cameras or mobile devices. The systems are also problematic in that it is difficult to prevent screen capture in mobile devices.

As described above, the conventional capture prevention systems have problems in that costs for the maintenance and repair of the systems are high and leaking through photos and moving images for a screen, the leaking of information using screen capture in mobile devices, and so on cannot be fundamentally prevented. Accordingly, there is an urgent need for the development of technology which can prevent the leaking of digital content through screen capture reliably and efficiently.

SUMMARY OF THE INVENTION

An object of the present invention is to provide a system and method for preventing the leaking of digital content which can prevent the illegal leaking of digital content that may occur through screen capture in a user terminal, such as a computer terminal or a portable terminal, by displaying digital content including information related to the user terminal or a relevant user when the digital content is displayed through the user terminal.

In order to achieve the object, an aspect of the present invention provides a system for preventing the leaking of digital content. The system for preventing the leaking of digital content includes a digital content layer generation unit for generating a digital content layer displaying digital content, a security layer generation unit for generating a security layer including security information based on information about a user terminal, and an information display unit for displaying the security layer and the digital content layer in a display device of the user terminal in an overlapping form so that the security information of the security layer looks like overlapping with the digital content of the digital content layer.

The security layer generation unit may generate the security information including the information of the user terminal and apply a preset transparency to the generated security information. The information of the user terminal may include at least any one of terminal ID information, IP information, a Media Access Control (MAC) address, and login information of the user terminal.

The security information may include at least any one of text indicating the information of the user terminal, encrypted information of the information of the user terminal, and digital watermark including the information of the user terminal. The size of the security layer may be any one of a size corresponding to a window in which the digital content layer is displayed and a size corresponding to a display screen.

The security layer generation unit may scan the digital content, contrast the scanned digital content with security element information stored in a database, and determine whether a security element is included in the digital content based on the contrast. The security layer generation unit may detect the position of the security element included in the digital content and designate the position of the security information on the security layer so that the security information looks like overlapping with a region corresponding to the detected position of the security element.

The system for preventing the leaking of digital content may further include a digital content selection unit for selecting the digital content in response to an external selection request signal, wherein the digital content layer generation unit may extract the selected digital content from a database and play the extracted digital content.

In order to achieve the object, another aspect of the present invention provides a method of preventing the leaking of digital content. The method of preventing the leaking of digital content includes generating a digital content layer displaying digital content, generating a security layer including security information based on information about a user terminal, and displaying the security layer and the digital content layer in a display device of the user terminal in an overlapping form so that the security information of the security layer looks like overlapping with the digital content of the digital content layer.

Generating the security layer may include generating the security information including the information of the user terminal and applying a preset first transparency to the generated security information.

The security information may include at least any one of text indicating the information of the user terminal, encrypted information of the information of the user terminal, and digital watermark including the information of the user terminal.

The method of preventing the leaking of digital content may further include contrasting the scanned digital content with security element information stored in a database and determining whether a security element is included in the digital content based on the contrast.

The method of preventing the leaking of digital content may further include detecting a position of a security element included in the digital content and designating the position of the security information on the security layer so that the security information looks like overlapping with a region corresponding to the detected position of the security element.

The method of preventing the leaking of digital content may further include selecting the digital content in response to an external selection request signal, wherein generating the digital content layer may include extracting the selected digital content from a database and playing the extracted digital content.

In order to achieve the object, yet another aspect of the present invention provides a system. The system may include a service server and a user terminal operated in conjunction therewith over a communication network. Here, the service server may transmit digital content, requested by the user terminal, to the user terminal. The user terminal may generate a digital content layer displaying the digital content received from the service server, generate a security layer including security information based on information about the user terminal, and display the security layer and the digital content layer in a display device of the user terminal in an overlapping form so that the security information of the security layer looks like overlapping with the digital content of the digital content layer.

The user terminal may generate the security information including the information of the user terminal and apply a preset transparency to the generated security information. The security information may include at least any one of text indicating the information of the user terminal, encrypted information of the information of the user terminal, and digital watermark including the information of the user terminal. The information of the user terminal may include at least any one of terminal ID information, IP information, a Media Access Control (MAC) address, and login information of the user terminal.

In order to achieve the object, further yet another aspect of the present invention provides a system. The system may include a service server and a user terminal which are operated in conjunction therewith over a communication network.

The service server may transmit digital content, requested by the user terminal, to the user terminal, generate a security layer including security information based on information about the user terminal that is received from the user terminal, and transmit the security layer to the user terminal. The user terminal may generate a digital content layer displaying the digital content received from the service server and display the security layer and the digital content layer in the display device of the user terminal so that the security information of the security layer looks like overlapping with the digital content of the digital content layer.

The service server may receive the information of the user terminal from the user terminal by requesting the information of the user terminal from the user terminal, generate the security information including the received information of the user terminal, and apply a preset transparency to the generated security information.

In order to achieve the object, still yet another aspect of the present invention provides a method of detecting leaked information according to still yet another aspect of the present invention. The method of detecting leaked information may include extracting security information from information about a screen on which a digital content layer displaying digital content and a security layer including security information based on information about a user terminal look like overlapping with each other, determining a type of the extracted security information, and extracting the information of the user terminal, corresponding to the security information, from the security information on the basis of the determined type of the security information.

As described above, in accordance with the present invention, when digital content that needs to be protected in a user terminal, such as a computer terminal or a portable terminal, a security layer including information related to the user terminal or a relevant user can be overlapped with and displayed in the digital content. Accordingly, an intention of the illegal leaking of digital content that may occur through photographing or screen capture using the camera of a user terminal can be prevented. Although leaking occurs, information about a user terminal from which leaking was performed can be easily tracked. Furthermore, additional maintenance and repair costs or upgrade costs for operating a leaking prevention system are not necessary.

BRIEF DESCRIPTION OF THE DRAWINGS

FIG. 4 is an exemplary diagram showing a screen of a display device which displays a security layer in an overlapping form;

DETAILED DESCRIPTION OF THE EMBODIMENTS

Hereinafter, some exemplary embodiments of the present invention will be described in detail with reference to the accompanying drawings in order for those skilled in the art to be able to readily understand the present invention. In the embodiments of the present invention, specific technical terminologies are used for clarity of the contents. It is however to be understood that the present invention is not limited to the specific terminologies and each terminology includes all technical synonyms used likewise in order to achieve similar objects.

Figure 1:
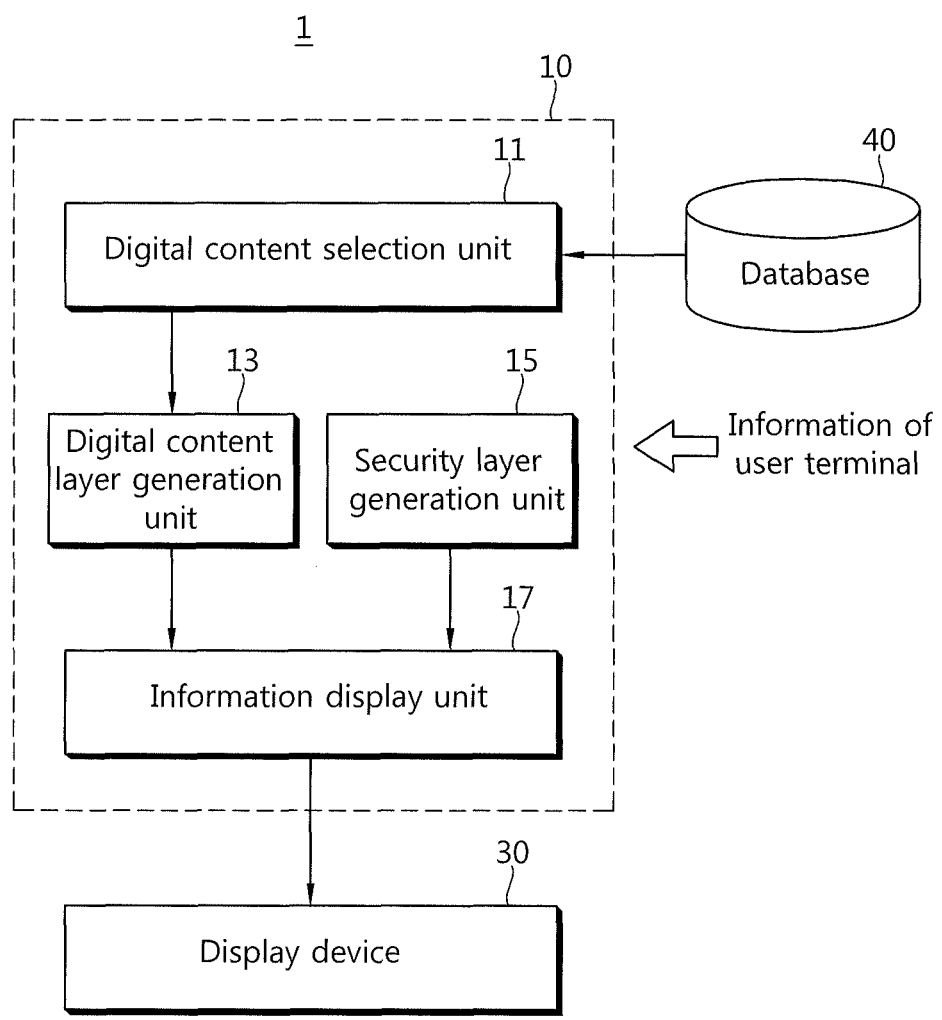
FIG. 1 is a block diagram showing the construction of a system for preventing the leaking of digital content according to an exemplary embodiment of the present invention.

FIG. 1 is a block diagram showing the construction of a system for preventing the leaking of digital content according to an exemplary embodiment of the present invention.

As shown in FIG. 1, the system for preventing the leaking of digital content 10 (hereinafter abbreviated as 'the system 10') may be provided in a user terminal 1. The user terminal 1 may be a fixed type computer terminal, such as a PC or digital TV, or a portable terminal, such as a smart phone, a mobile phone, a notebook, or a Personal Digital Assistant (PDA).

The user terminal 1 may include a display device 30 for displaying information. The display device 30 may be, for example, a Liquid Crystal Display (LCD) panel, a Plasma Display Panel (PDP), or an Organic Light Emitting Diode (OLED) panel. The user terminal 1 may include a database 40 for storing and managing data. The system 10 may be operated in conjunction with the display device 30 and the database 40.

The system 10 may include a digital content selection unit 11, a digital content layer generation unit 13, a security layer generation unit 15, and an information display unit 17.

The digital content selection unit 11 may perform a function of selecting digital content to be displayed in response to a selection request signal from a user. The digital content may be information including text or images, such as digital documents or digital certificates, or a moving image.

The digital content selection unit 11 may display a list of pieces of digital content, stored in the database 40, through the display device 30 and provide an input interface that enables a user to select and request desired digital content. When a user requests specific digital content in the list, the content selection unit 11 may transmit a selection signal, indicting that the requested content has been selected, to the digital content layer generation unit 13.

The digital content layer generation unit 13 may perform a function of generating a digital content layer for displaying digital content, selected by the digital content selection unit 11, in the display device 30. The digital content layer generation unit 13 may extract digital content, corresponding to a selection signal transmitted by the digital content selection unit 11, from the database 40 and display the extracted digital content in the display device 30 by playing the extracted digital content. The digital content layer may mean a layer on graphics that display played digital content.

Here, a security layer is graphically overlaid on the played and displayed digital content (i.e., the digital content layer) by the information display unit 17, although described later, and thus the security information of the security layer looks like overlapping with the digital content. Meanwhile, if the digital content has been coded or encrypted, the digital content layer generation unit 13 may play decode and play the encoded or encrypted digital content.

The security layer generation unit 15 may perform a function of generating a security layer including security information based on information about the user terminal 1. The information of the user terminal 1 may be device information, such as terminal ID information, IP information, and Media Access Control (MAC) address of the user terminal 1, or user information, such as user login information. The information of the user terminal 1 may include one or more of the pieces of information.

The security layer generation unit 15 may generate a security layer to be overlapped with a digital content layer by extracting information about the user terminal 1 from the user terminal 1, generating security information including the extracted information, and applying a specific transparency to the generated security information.

The transparency may be set in various ways within a range that a user does not feel inconvenient in viewing the digital content of the digital content layer. The setting value of the transparency may be managed by the security layer generation unit 15 or may be stored and managed in the database 40. The security information may be text indicating the information of the user terminal 1, encrypted information of the information of the user terminal 1, digital watermark including the information of the user terminal 1, or the like.

Meanwhile, the security layer generation unit 15 may scan digital content selected by the digital content selection unit 11, determine whether there is a security element in the scanned digital content, and then generate the security layer only when the security element exists.

For example, the security layer generation unit 15 may scan digital content, determine whether a security element exists in the scanned digital content by contrasting the scanned digital content with security element information previously stored in the database 40, and generate the security layer only when the security element exists or not generate the security layer when there is no security element.

The security element is an element for determining whether digital content is a document requiring security. The security element may be, for example, a passage, such as 'confidential' in a digital document, an image of a specific form, text requiring security, such as a 'resident registration number' and '000000-0000000' in a certificate, or a specific image, such as a registered seal impression image. Pieces of information about the security elements may be previously stored and managed in the database 40. The security layer generation unit 15 can determine whether there is a security element in digital content by using the database 40.

The security layer generation unit 15 may detect a position in a region where a security element is placed in scanned digital content and designate the position of security information on a security layer when generating the security layer so that the security information is placed in a region corresponding to the detected position of the security element. That is, the security layer generation unit 15 generates the security layer such that the security information of the security layer looks like overlapping with the security element of the digital content. This is for more strictly guaranteeing security for important information in the digital content.

Meanwhile, the security layer generation unit 15 may generate the size of a security layer so that the size corresponds to a window in which digital content is displayed or the size corresponds to the entire screen of a display device.

The information display unit 17 may perform a function of displaying a digital content layer and a security layer in the display device 30 of the user terminal so that the security information of the security layer graphically looks like overlapping with the digital content of the digital content layer.

For example, the information display unit 17 may place a security layer having a set transparency on a digital content layer (i.e., a graphic layer displaying digital content being played) and display the security layer in a screen. Accordingly, security information about the security layer and the digital content being played are displayed in an overlapping form.

Figure 2:
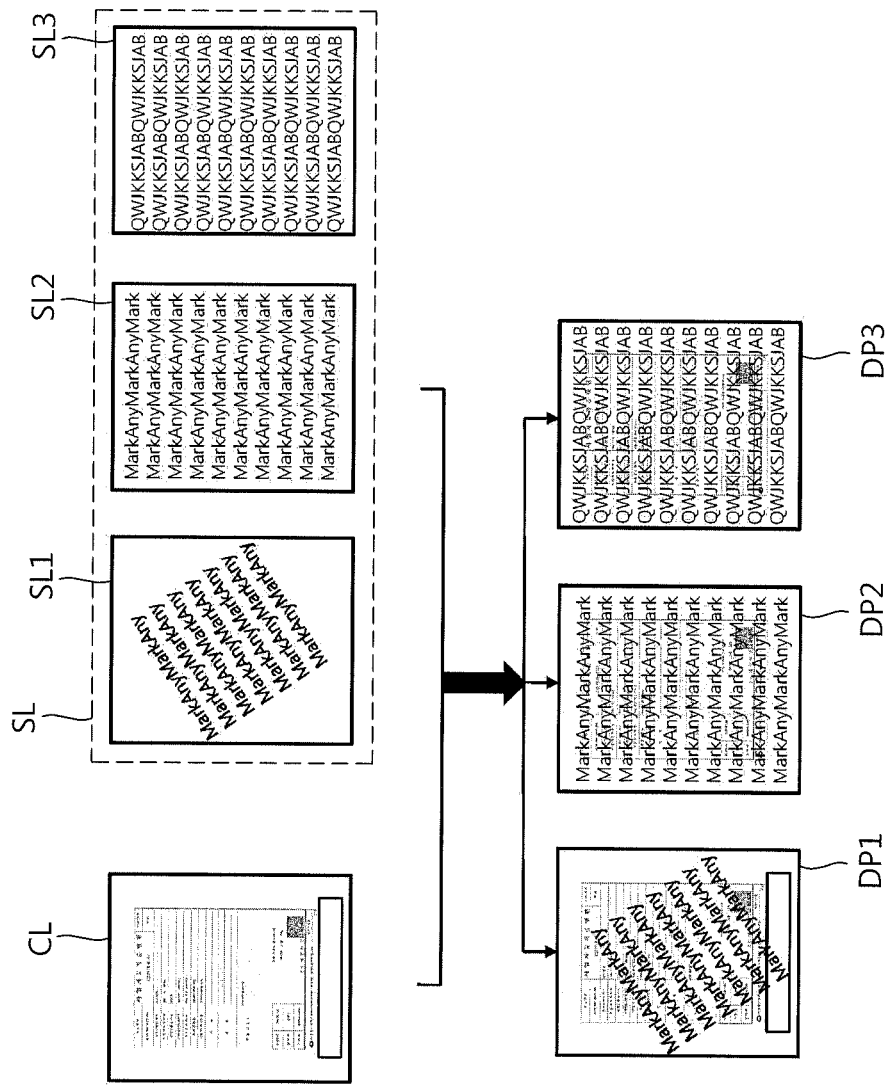
FIG. 2 is an exemplary diagram showing a screen display in a display device when security information about a security layer is implemented into text indicating information about a user terminal or encrypted information of the information about the user terminal.

FIG. 2 is an exemplary diagram showing a screen displayed in the display device 30 when security information about a security layer is implemented into text indicating information about the user terminal 1 or encrypted information of the information about the user terminal 1.

As shown in FIG. 2, if the digital content of a digital content layer CL is a 'business registration certificate' and each of security layers SL1 and SL2 includes security information in which a plurality of 'MakAny' (i.e., text indicating information about the user terminal 1) is arranged in an inclined quadrangle or a quadrangle region, the information display unit 17 displays the 'business registration certificate' of the digital content layer and the text image of the security layer in the screens DP1 and DP2 of the display device 30 in an overlapping form.

If the displayed screens DP1 and DP2 are leaked through photographing or screen capture because the text of the security layer is information that directly displays the information of the user terminal 1, a user can immediately know that the text has been leaked from where with the naked eye.

Meanwhile, if the digital content of the digital content layer CL is a 'business registration certificate' and a security layer SL3 is an image of information (e.g., an image in a form in which encrypted codes are repeated) obtained by encrypting the information of the user terminal, the information display unit 17 displays the 'business registration certificate' of the digital content layer and the image of the encrypted information of the security layer in the screen DP3 of the display device 30 in an overlapping form. In this case, if the displayed screen DP3 is leaked through photographing or screen capture, a user can know that the screen DP3 has been leaked from where by interpreting the encrypted information.

Figure 3:
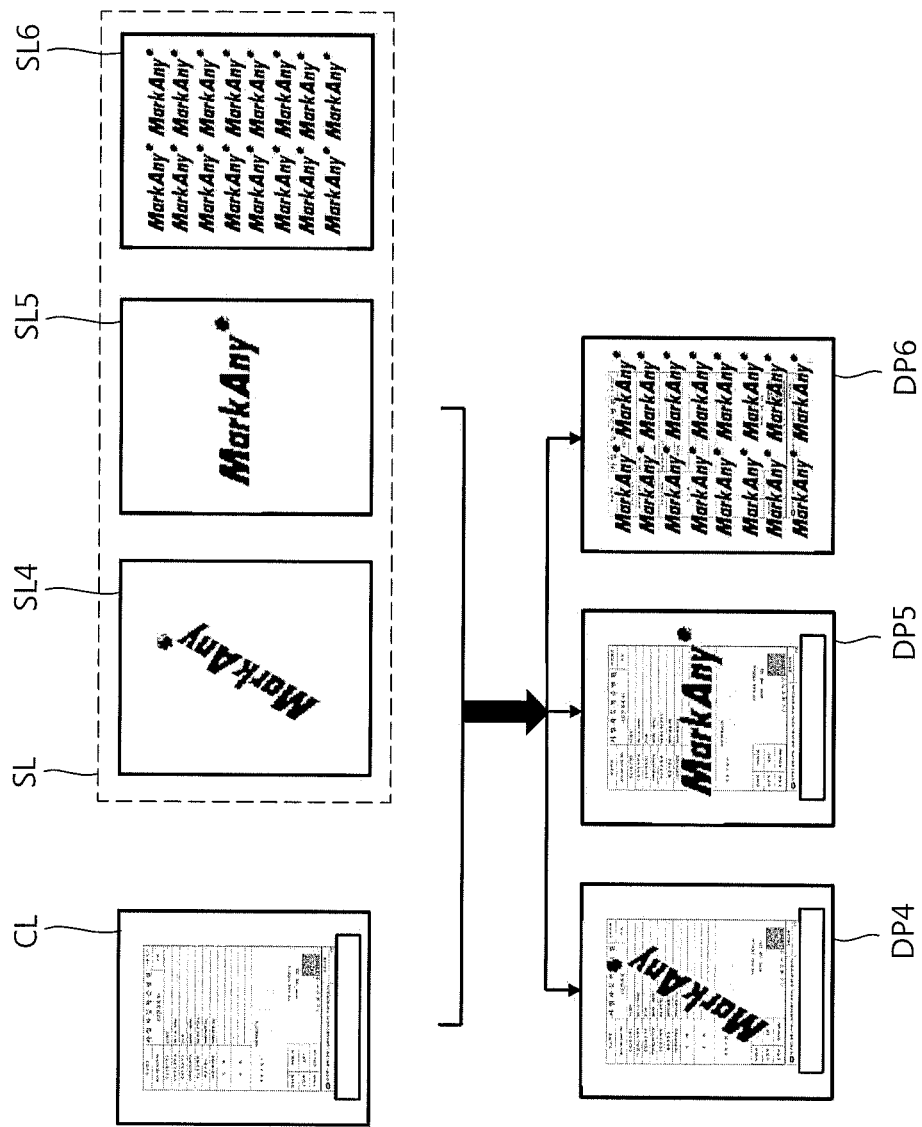
FIG. 3 is an exemplary diagram showing a screen displayed in a display device when security information about a security layer is implemented into watermark including information about a user terminal.

FIG. 3 is an exemplary diagram showing a screen displayed in the display device 30 when security information about a security layer is implemented into watermark including information about the user terminal 1.

As shown in FIG. 3, if the digital content of a digital content layer CL is a 'business registration certificate' and each of security layers SL4, SL5, and SL6 includes non-recognition type watermark including information about the user terminal 1 (e.g., a form in which a single design is inclined diagonally to the screen, a form in which a single design is horizontally placed at the center of the screen, or a form in which a plurality of designs is regularly arranged in a specific area), the information display unit 17 displays the 'business registration certificate' of the digital content layer and the watermark of the security layer in the screens DP4, DP5, and DP6 of the display device 30 in an overlapping form.

If the displayed screens DP4, DP5, and DP6 are leaked through photographing or screen capture, a user can know that the screens DP4, DP5, and DP6 have been leaked from where by interpreting the watermark. The watermark includes information, but the watermark may be non-recognition type watermark that is seen as a common design by an eye of a user.

The examples in which the security layers SL1 to SL6 are implemented in the six forms have been described above with reference to FIGS. 2 and 3. It is, however, to be noted that in configuring security information about a security layer, text, encrypted text, and the arrangement, number, color, etc. of watermark designs may be modified in various ways. Furthermore, a security layer including security information in a form in which two or more of text, encrypted text, and watermark are mixed may be configured.

FIG. 4 is an exemplary diagram showing a screen displayed in the display device 30 which displays a security layer in an overlapping form.

As shown in FIG. 4, the information display unit 17 may display a security layer only in a window in which digital content is displayed in an overlapping form or may display the security layer in the entire screen of the display device 30 in an overlapping form.

To this end, the security layer generation unit 15 may generate the size of the security layer so that the size corresponds to the window in which the digital content is displayed or may generate the size of the security layer so that the size corresponds to the entire screen of the display device.

The security layer generation unit 15 and the information display unit 17 may provide a user interface for configuring that the security layer will be generated according to what size and a user interface for configuring that the security layer will be applied to what area, respectively, and manage the configured information.

Figure 5:
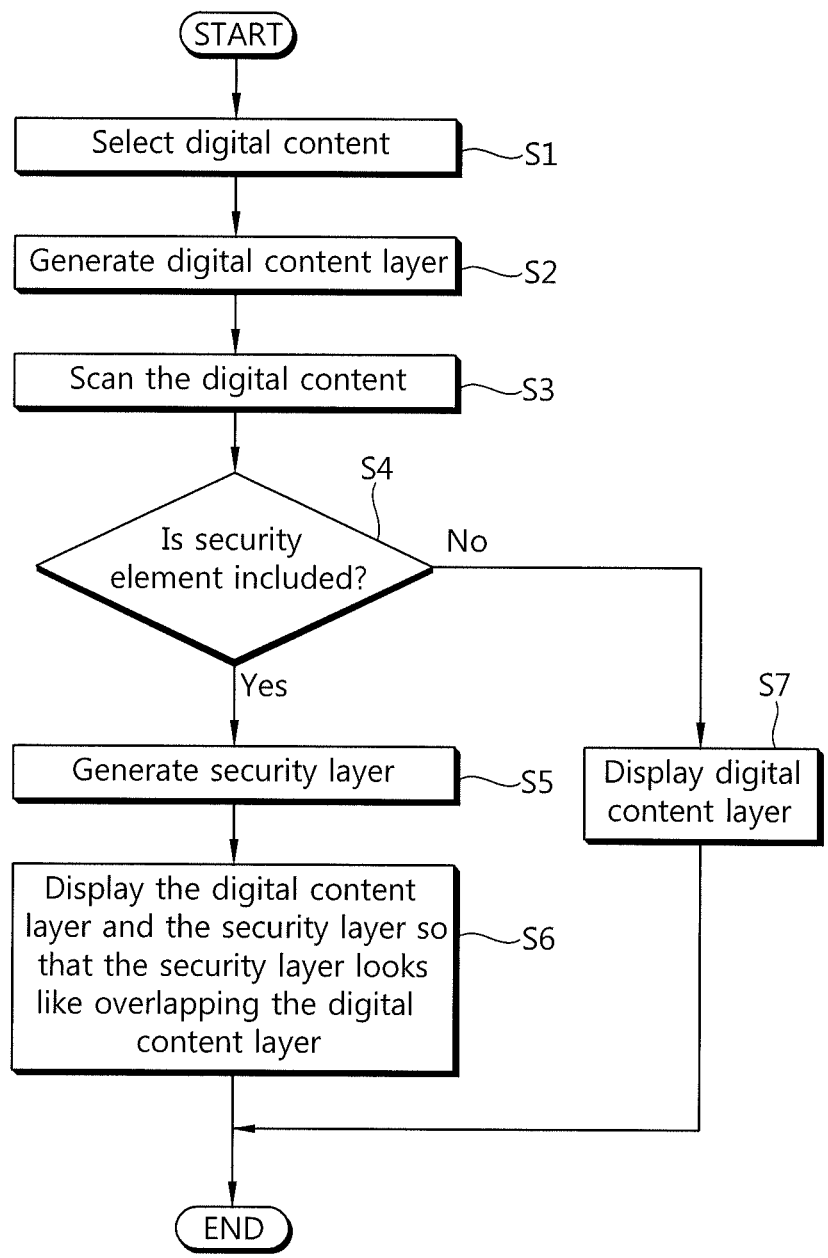
FIG. 5 is a flowchart illustrating a method of preventing the leaking of digital content according to an exemplary embodiment of the present invention.

FIG. 5 is a flowchart illustrating a method of preventing the leaking of digital content according to an exemplary embodiment of the present invention.

As shown in FIG. 5, the system 10 may select digital content in response to a request signal from a user at step S1. The digital content may be information including text or an image, such as a digital document or a digital certificate, or a moving image.

For example, the system 10 may display a list of pieces of digital content stored in the database 40 through the display device 30 and provide an input interface that enables a user to select and request desired digital content. When the user requests specific digital content in the list through the input interface, the system 10 may select the requested content.

Next, the system 10 may generate a digital content layer for displaying the selected digital content in the display device 30 at step S2. For example, the system 10 may extract the selected digital content from the database 40, generate a digital content layer, and display the extracted digital content on the digital content layer by playing the extracted digital content.

Next, the system 10 may scan the selected digital content at step S3 and determine whether a security element exists in the scanned digital content by contrasting the elements of the scanned digital content with security element information stored in the database 40 at step S4. If, as a result of the determination, a security element is determined not to exist in the scanned digital content, the system 10 does not generate a security layer and directly displays the digital content layer through the display device 30 at step S7.

If, as a result of the determination at step S4, a security element is determined to exist in the scanned digital content, the system 10 may generate a security layer including security information based on information about the user terminal 1 at step S5. For example, the system 10 may generate the security layer to be overlapped with the digital content layer by extracting information about the user terminal 1 from the user terminal 1, generating the security information including the extracted information, and applying a specific transparency to the generated security information.

As described above, the information of the user terminal 1 may be device information, such as terminal ID information, IP information, and an MAC address of the user terminal 1, or user information, such as user login information. The information of the user terminal 1 may include one or more of the pieces of information. Furthermore, the security information may be text indicating the information of the user terminal 1, encrypted information of the information of the user terminal 1, digital watermark including the information of the user terminal 1, or the like.

Meanwhile, the system 10 may detect a position in a region where the security element is placed in the scanned digital content and designate the position of security information on a security layer when generating the security layer so that the security information is placed in a region corresponding to the detected position of the security element. That is, the security information of the security layer is overlapped with the security element of the digital content and then displayed.

Next, the system 10 may graphically display the digital content layer and the security layer in the display device 30 of the user terminal in an overlapping form so that the security information of the security layer looks like overlapping with the digital content of the digital content layer at step S6.

For example, the system 10 may place a security layer having a set transparency on a digital content layer (i.e., a graphic layer displaying digital content being played) and display the security layer in a screen. Accordingly, security information about the security layer is overlapped with the digital content displayed in a screen and is then displayed.

The construction and operation of the system 10 according to the exemplary embodiment of the present invention have been described above. In accordance with the system 10, when digital content that needs to be protected is displayed in the user terminal 1, such as a computer terminal or a portable terminal, a security layer including information related to the user terminal 1 or a relevant user (i.e., information about the user terminal 1) can be overlapped with the digital content and then displayed.

Accordingly, an intention of the illegal leaking of digital content that may occur through photographing or screen capture using the camera of the user terminal 1 can be prevented, and information about the user terminal 1 from which leaking was performed can be easily tracked although leaking occurs. Furthermore, additional maintenance and repair costs or upgrade costs for operating a leaking prevention system are not necessary.

Meanwhile, the technical spirit of the system according to the present invention may also be applied to a server and client system. In a system in which a user terminal receives digital content from a service server serving content and displays the received digital content, some embodiments of systems for preventing the leaking of digital content are described below.

Figure 6:
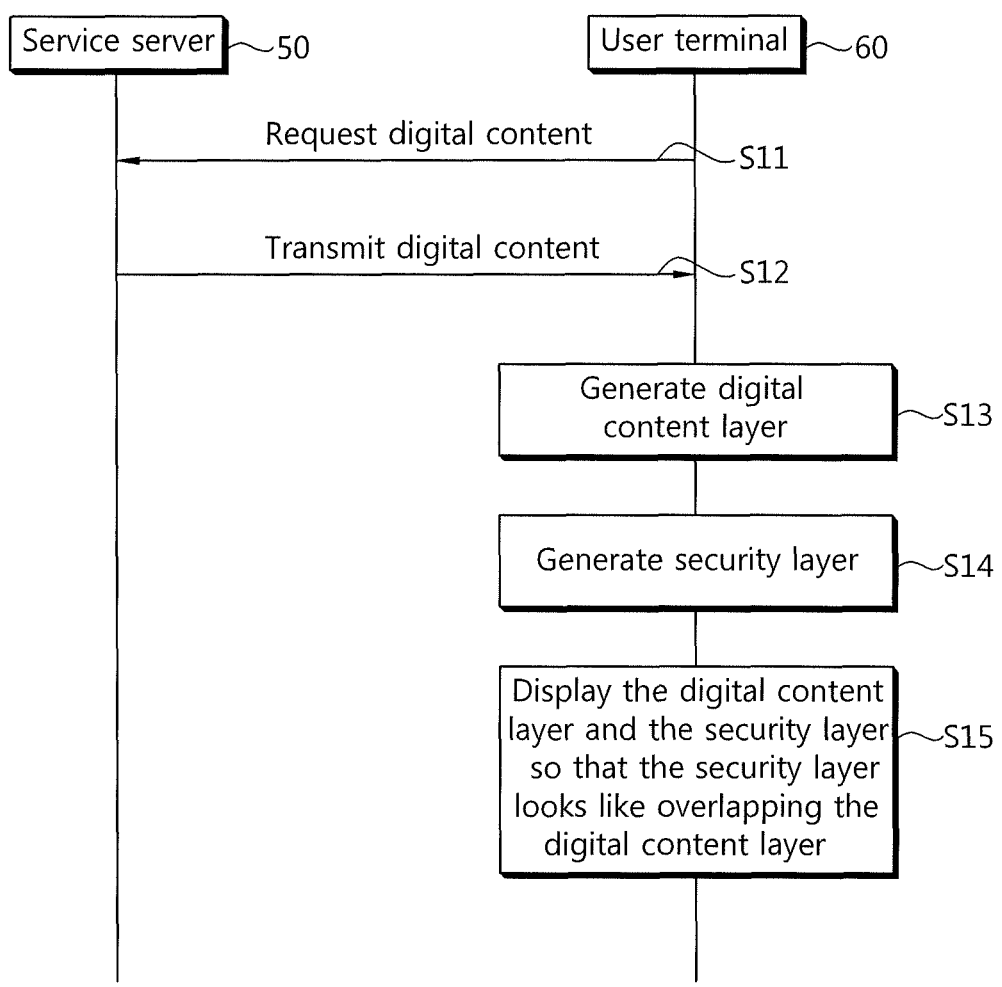
FIG. 6 is a flowchart illustrating a system for preventing the leaking of digital content according to another exemplary embodiment of the present invention.

FIG. 6 is a flowchart illustrating a system for preventing the leaking of digital content according to another exemplary embodiment of the present invention.

As shown in FIG. 6, the system for preventing the leaking of digital content according to another exemplary embodiment of the present invention may include a service server 50 and a user terminal 60 which are operated in conjunction therewith over a communication network.

The service server 50 may perform a function of providing digital content at the request of the user terminal 60 at steps S11 to 12. The user terminal 60 may generate a digital content layer that displays the digital content received from the service server 50 at step S13 and generate a security layer including security information based on information about the user terminal 60 at step S14. The user terminal 60 may display the digital content of the digital content layer in the display device of the user terminal 60 so that the digital content of the digital content layer looks like overlapping with the security information of the security layer at step S15.

The above embodiment may be related to the system for preventing the leaking of digital content, in which the service server 50 provides digital content and the user terminal 60 generates a security layer and displays the security layer and the digital content in an overlapping form in order to protect the digital content provided by the service server 50. Each of the steps has been described in detail in the previous embodiment, and thus a description thereof is omitted. The system for preventing the leaking of digital content may be usefully applied to systems that issue certificates through user terminals in public offices, schools, and hospitals.

Figure 7:
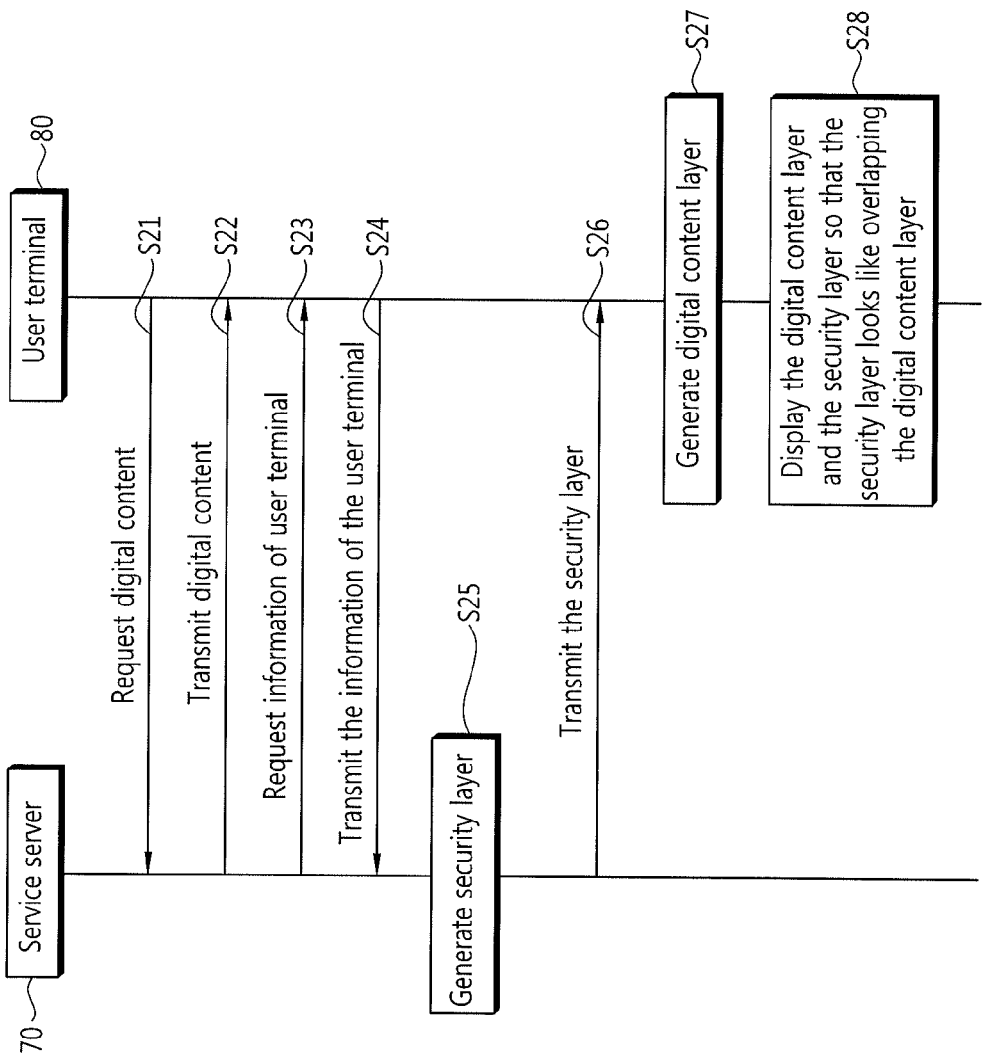
FIG. 7 is a flowchart illustrating a system for preventing the leaking of digital content according to yet another exemplary embodiment of the present invention.

FIG. 7 is a flowchart illustrating a system for preventing the leaking of digital content according to yet another exemplary embodiment of the present invention.

As shown in FIG. 7, the system for preventing the leaking of digital content according to yet another exemplary embodiment of the present invention may include a service server 70 and a user terminal 80 which are operated in conjunction therewith over a communication network.

The service server 70 may transmit digital content to the user terminal 80 in response to a request from the user terminal 80 at steps S21 and S22. Next, the service server 70 may request information about the user terminal 80 from the user terminal 80 at step S23, receive the information of the user terminal 80 from the user terminal 80 at step S24, generate a security layer including security information on the basis of the information of the user terminal 80 at step S25, and transmit the security layer to the user terminal 80 at step S26.

The user terminal 80 may generate a digital content layer displaying the digital content received from the service server 70 at step S27 and then display the digital content layer in the display device of the user terminal 80 so that the digital content layer looks like overlapping with the security layer of the service server 70 at step S28.

The above embodiment is related to the system for preventing the leaking of digital content in which the service server 70 provides digital content and a security layer and the user terminal 80 displays the digital content and the security layer in an overlapping form. Like in the embodiment described with reference to FIG. 6, the system for preventing the leaking of digital content may be usefully applied to systems that issue certificates through user terminals in public offices, schools, and hospitals.

Figure 8:
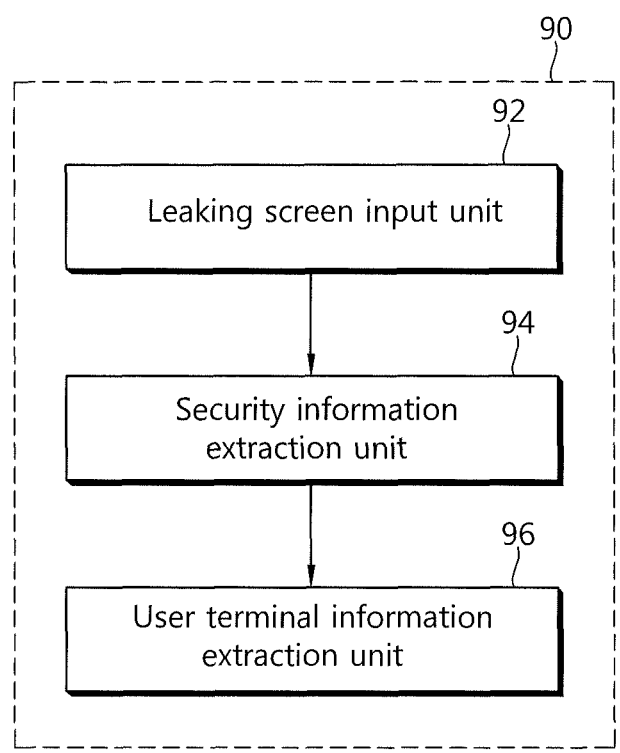
FIG. 8 is a block diagram showing a system for detecting the leaking of digital content according to an exemplary embodiment of the present invention.

FIG. 8 is a block diagram showing a system for detecting the leaking of digital content according to an exemplary embodiment of the present invention.

As shown in FIG. 8, the system 90 for detecting the leaking of digital content may include a leaking screen input unit 92, a security information extraction unit 94, and a user terminal information extraction unit 96.

The leaking screen input unit 92 may perform a function of receiving a screen image leaked through screen capture or photographing. The received screen image may be an image (i.e., an image of a screen on which a digital content layer displaying digital content and a security layer including security information based on information about the user terminal are overlapped with each other and displayed) displayed in the user terminal of the system for preventing the leaking of digital content.

The security information extraction unit 94 may extract security information from the screen image received from the leaking screen input unit 92. The user terminal information extraction unit 96 may check a type of the extracted security information, extract the information of the user terminal from the security information, and display the extracted information through the display means. Accordingly, a user can know information about the leaked screen.

As described above, the security information may be, for example, text indicating information about a user, encrypted information of information about a user terminal, or watermark including information about a user terminal. If the security information is text indicating information about a user, a user can check a leaking path with the naked eye.

Meanwhile, if the security information is encrypted information or watermark, a user cannot check information about a user terminal with the naked eye. Accordingly, the user terminal information extraction unit 96 may determine whether security information about a leaked screen is encrypted information or watermark and extract information about a user terminal by performing decryption, watermark reading, etc. according to a result of the determination.

Although the some embodiments of the present invention have been described above, a person having ordinary skill in the art will appreciate that the present invention may be modified and changed in various ways without departing from the technical spirit and scope of the present invention. Accordingly, the present invention is not limited to the embodiments and the present invention may be said to include all embodiments within the scope of the claims below.

What is claimed is:

1. A system for preventing a leaking of digital information, comprising:
    a digital content layer generation unit for generating a digital content layer displaying digital content;
    a security layer generation unit for generating a security layer including security information based on information about a user terminal, wherein the security layer generation unit scans the digital content to be displayed, contrasts the scanned digital content with security element information stored in a database, determines whether a security element different from information about the user terminal is included in the digital content based on the contrast, and generates the security layer in response to a determination that the security element is included in the digital content; and
    an information display unit for displaying the security layer and the digital content layer in a display device of the user terminal in an overlapping form so that the security information of the security layer looks like overlapping with the digital content of the digital content layer.

2. The system as claimed in claim 1, wherein the security layer generation unit generates the security information including the information of the user terminal and applies a preset transparency to the generated security information.

3. The system as claimed in claim 2, wherein the security information includes at least any one of text indicating the information of the user terminal, encrypted information of the information of the user terminal, and digital watermark including the information of the user terminal.

4. The system as claimed in claim 2, wherein the security layer generation unit detects a position of the security element included in the digital content and designates a position of the security information on the security layer so that the security information looks like overlapping with a region corresponding to the detected position of the security element.

5. The system as claimed in claim 1, wherein a size of the security layer is any one of a size corresponding to a window in which the digital content layer is displayed and a size corresponding to a display screen.

6. The system as claimed in claim 1, further comprising a digital content selection unit for selecting the digital content in response to an external selection request signal, wherein the digital content layer generation unit extracts the selected digital content from a database and plays the extracted digital content.

7. The system as claimed in claim 1, wherein the information of the user terminal includes at least any one of terminal ID information, IP information, a Media Access Control (MAC) address, and login information of the user terminal.

8. A method of preventing a leaking of digital information, comprising:
    generating a digital content layer displaying digital content;
    scanning the digital content;
    contrasting the scanned digital content with security element information stored in a database;
    determining whether a security element different from information about the user terminal is included in the digital content based on the contrast;
    generating a security layer including security information based on information about the user terminal in response to a determination that the security element is included in the digital content; and
    displaying the security layer and the digital content layer in a display device of the user terminal in an overlapping form so that the security information of the security layer looks like overlapping with the digital content of the digital content layer.

9. The method as claimed in claim 8, wherein generating the security layer comprises:
    generating the security information including the information of the user terminal; and
    applying a preset first transparency to the generated security information.

10. The method as claimed in claim 9, wherein the security information includes at least any one of text indicating the information of the user terminal, encrypted information of the information of the user terminal, and digital watermark including the information of the user terminal.

11. The method as claimed in claim 9, further comprising:
    detecting a position of the security element included in the digital content; and
    designating a position of the security information on the security layer so that the security information looks like overlapping with a region corresponding to the detected position of the security element.

12. The method as claimed in claim 8, further comprising selecting the digital content in response to an external selection request signal, wherein generating the digital content layer includes extracting the selected digital content from a database and playing the extracted digital content.

13. The method as claimed in claim 8, wherein the information of the user terminal includes at least any one of terminal ID information, IP information, a Media Access Control (MAC) address, and login information of the user terminal.

* * * * *